Dec. 11, 1934.   B. S. GARVEY, JR   1,983,976
VENTED MOLD
Filed July 1, 1933
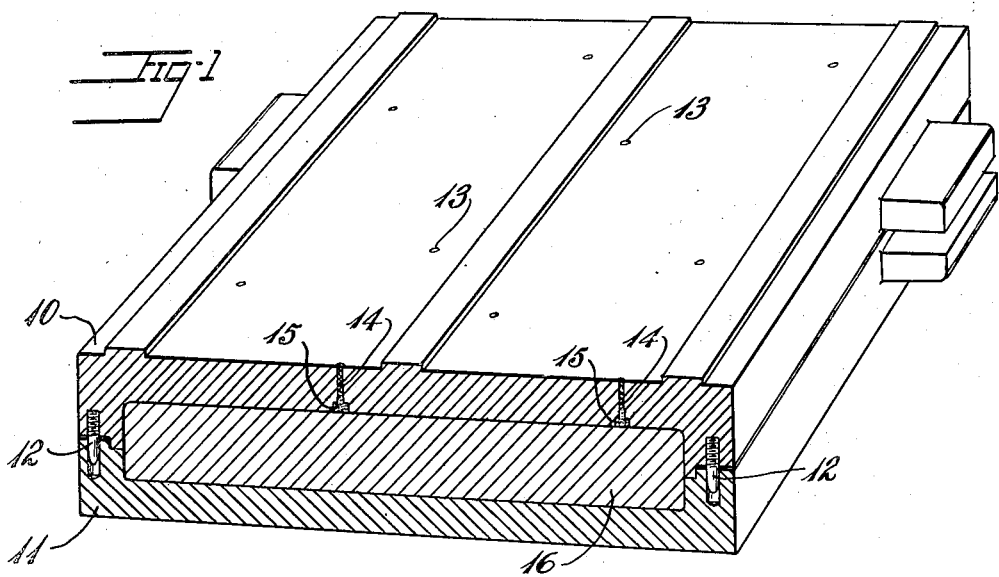
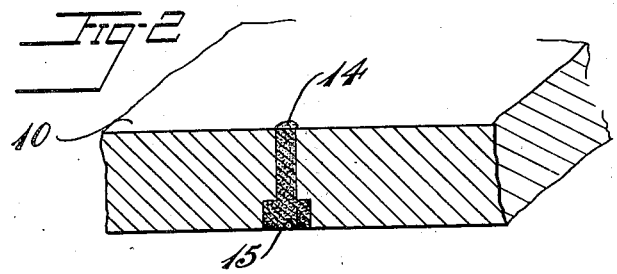
Inventor
Benjamin S. Garvey Jr.
By Eakin + Avery
Attys Patented Dec. 11, 1934

1,983,976

UNITED STATES PATENT OFFICE 1,983,976

VENTED MOLD

Benjamin S. Garvey, Jr., Akron, Ohio, assignor to The B. F. Goodrich Company, New York, N. Y., a corporation of New York Application July 1, 1933, Serial No. 678,591

9 Claims. (Cl. 18—42)

This invention relates to molds for use in vulcanizing rubber, and particularly to a vented mold especially adapted for vulcanization of sponge or like rubber compositions which normally evolve large quantities of gases during vulcanization.

In the vulcanization of rubber, considerable quantities of hydrogen sulfide are produced as a result of the reaction of the rubber with sulfur added to effect vulcanization, and other gases are produced by the liberation, decomposition, and reaction of added materials under the influence of the elevated temperatures employed in vulcanizing processes. This is especially true in the manufacture of sponge rubber where quantities of so-called "blowing agents" which decompose when heated and evolve large volumes of gases are mixed with the rubber for the purpose of expanding it during vulcanization to produce a spongy product. It is necessary to provide some means of allowing excess quantities of these evolved gases to escape from the interior of the mold. Heretofore, small venting openings have been provided at various points in the mold body which have furnished channels connecting the mold cavity with the outside atmosphere, through which the gases could escape. This practice is undesirable, however, because the rubber during vulcanization flows into these openings and is there vulcanized to produce unsightly protuberances upon the rubber product, which must be removed. Also, the flow of the plastic heated rubber into the venting openings during vulcanization often has tended to seal the opening and prevent satisfactory escape of the gases.

Accordingly, the chief object of the present invention is to provide a simple, efficient and economical vented mold having a smooth mold face unbroken by venting openings into which rubber may flow. It is a further object of the invention to provide improved easily replaceable venting means for rubber molds.

Other objects will be apparent from the following description of the invention which will be made with reference to the accompanying drawing in which Fig. 1 is a sectioned perspective view of a mold embodying the present invention in a preferred form, with rubber therein, and Fig. 2 is a sectioned perspective view on a larger scale of a portion of the mold including the improved venting means of the invention.

The specific embodiment of the invention shown in the drawing includes a metal cavity mold comprising separate top and bottom portions 10 and 11 properly registered by means of dowel pins 12. A number of venting openings 13, preferably recessed, connecting the mold cavity with the outside atmosphere, are provided in the body of the mold parts, and these openings are filled with plugs 14 of gas-pervious material having integral shoulders 15 which cooperate with the recesses in the venting openings to prevent outward movement of the plugs. The plugs terminate flush with the mold face to provide a smooth unbroken molding surface.

The gas-pervious plugs preferably are formed of porous carbon, earthenware, or similar gas-pervious material having sufficient rigidity to withstand forces resulting from flow and expansion of the rubber during vulcanization. Plugs cut to shape from porous carbon rods which may be purchased on the open market, have proved particularly satisfactory both as regards venting properties and physical strength.

In an alternative embodiment, the plugs may be molded in place by filling the venting openings with a pasty moldable composition which may be dried to produce a plug possessing the requisite properties. For example, mixtures of granular material such as sand together with a suitable binder such as a bakelite lacquer may be tamped into the venting openings, and dried to produce a satisfactory porous plug. Other suitable granular materials and binders may be used.

When rubber 16 is vulcanized in a mold embodying the present invention any excess gases may escape readily through the plugs of porous material, and the finished product will have a smooth surface free of protuberances or other unsightly surface irregularities because the openings in the plugs are so small that they leave no undesirable marking upon the product, but readily permit the passage of gases. If through long use the plugs should become clogged with foreign material, they may be replaced with little expense and effort, simply by pushing the old plug out of the opening and inserting a new one. Other advantages will be apparent to one skilled in rubber manufacture.

It is apparent that the plugs and corresponding venting openings may be any desired shape, and that they may or may not include cooperating shoulders and recesses as described, although this feature is usually desirable to prevent movement during vulcanization which might disturb the flush relationship of the plug with the mold face.

The invention may be used in molding plastic materials other than rubber, where venting is necessary, and modifications may be made in details of construction and materials without departing from the spirit of the invention as defined in the appended claims.

I claim:

1. In a mold for vulcanizing rubber, a gas-impervious mold body having a venting opening and a gas-pervious plug in said opening.

2. In a mold for vulcanizing rubber, a gas impervious mold body having a venting opening plugged with a gas-pervious plug terminating flush with the mold face, said plug having sufficient rigidity to resist distortion during vulcanization.

3. In a mold for vulcanizing rubber, a gas-impervious mold body having a venting opening plugged with a gas-pervious plug locked against outward movement during vulcanization of rubber in the mold.

4. In a mold for vulcanizing rubber, a gas-impervious mold body having a recessed venting opening plugged with a gas-pervious plug terminating flush with the mold face, said plug having a shoulder cooperating with the recessed opening to prevent movement of the plug during vulcanization.

5. In a mold for vulcanizing rubber, a gas-impervious mold body having a venting opening, and a gas-pervious carbon plug closing the opening and providing a smooth mold face.

6. In a mold for vulcanizing rubber, a metal mold body having a venting opening, and a gas pervious carbon plug in said opening.

7. In a mold for vulcanizing rubber, a gas-impervious mold body having a recessed venting opening, and a gas-pervious carbon plug closing the opening and terminating flush with the mold face, said plug having a shoulder cooperating with the recess in the opening to prevent outward movement of the plug from its flush relationship with respect to the mold face.

8. In a mold for vulcanizing rubber, a gas-impervious mold body having a venting opening, and a gas-pervious plug in said opening, said plug comprising granular material and a binder therefor.

9. In a mold for vulcanizing rubber, a gas-impervious mold body having a venting opening, and a gas-pervious plug closing the opening and providing a smooth mold face, said plug comprising granular material and a binder therefor.

BENJAMIN S. GARVEY, Jr.